US009888228B1

(12) United States Patent
Lacaze et al.

(10) Patent No.: US 9,888,228 B1
(45) Date of Patent: Feb. 6, 2018

(54) OMNI-DIRECTIONAL STEREO SYSTEM

(71) Applicants: Alberto Daniel Lacaze, Potomac, MD (US); Karl Nicholas Murphy, Rockville, MD (US)

(72) Inventors: Alberto Daniel Lacaze, Potomac, MD (US); Karl Nicholas Murphy, Rockville, MD (US)

(73) Assignee: ROBOTIC RESEARCH, LLC, Gaithersburg, MD (US)

( * ) Notice: Subject to any disclaimer, the term of this patent is extended or adjusted under 35 U.S.C. 154(b) by 105 days.

(21) Appl. No.: 14/800,502

(22) Filed: Jul. 15, 2015

Related U.S. Application Data

(60) Provisional application No. 62/024,944, filed on Jul. 15, 2014.

(51) Int. Cl.
*G02B 17/08* (2006.01)
*H04N 13/02* (2006.01)
*G02B 5/04* (2006.01)
*G02B 17/00* (2006.01)
*G02B 6/06* (2006.01)

(52) U.S. Cl.
CPC ......... *H04N 13/0246* (2013.01); *G02B 5/045* (2013.01); *G02B 6/06* (2013.01); *G02B 17/002* (2013.01); *G02B 17/0836* (2013.01); *H04N 13/0235* (2013.01)

(58) Field of Classification Search
CPC ........... H04N 13/0246; H04N 13/0235; G02B 17/0836; G02B 5/045; G02B 6/06; G02B 17/002
See application file for complete search history.

(56) References Cited

U.S. PATENT DOCUMENTS

| | | | |
|---|---|---|---|
| 2009/0034086 A1* | 2/2009 | Montgomery | G03B 35/10 359/629 |
| 2010/0200736 A1* | 8/2010 | Laycock | G02B 6/06 250/227.2 |
| 2011/0286093 A1* | 11/2011 | Bittner | G02B 27/22 359/466 |
| 2012/0162393 A1* | 6/2012 | Okegawa | H04N 5/23209 348/50 |
| 2015/0264259 A1* | 9/2015 | Raghoebardajal | H04N 5/23238 348/36 |

* cited by examiner

*Primary Examiner* — Christopher S Kelley
*Assistant Examiner* — Nasim Nirjhar
(74) *Attorney, Agent, or Firm* — White-Welker & Welker, LLC; Matthew T. Welker, Esq.

(57) ABSTRACT

The invention presents an omnidirectional system capable of collecting horizontal disparities in multiple angles. The user of the display system will be able to move its head, changing yaw and tilt. Another incarnation to the invention also allows for roll. The system is composed of a series of prisms and/or mirrors arranged in a circular pattern. The prisms or mirrors provide a 90 degree shift of the imagery collected, enabling a single camera to perform the image acquisition.

18 Claims, 17 Drawing Sheets

OMNI-DIRECTIONAL STEREO SYSTEM

CROSS REFERENCE TO RELATED APPLICATIONS

This application claims priority from U.S. Patent Application Ser. 62/024,944, entitled "Omni-directional Stereo System", filed on 15 Jul. 2014. The benefit under 35 USC § 119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to an omni-directional stereo system. More specifically, the present invention relates to an omni-directional stereo system capable of collecting horizontal disparities in multiple angles.

BACKGROUND OF THE INVENTION

Currently, content for omnidirectional stereo displays is relegated to video games where the stereo disparity is artificially generated by the gaming engine. There is interest and need to generate and record content from other sources. Because stereo displays need two viewpoints to create the ocular disparity required for human 3D dimensional image understanding, and the fact that the pose of the display apparatus changes in six dimensions, traditional image collection and encoding mechanisms are not well suited for the task.

Although the process of collecting and encoding fixed stereo imagery has been studied and demonstrated over the years, the because often the pose of the head tracking device used by the viewer is not known at the time of the recording, moreover, it is likely that multiple viewers will try to enjoy the recording by moving the their heads in different directions. Therefore, the omnidirectional or many-directional data collection is would be a useful tool however, possessing a set of challenges that this invention addresses.

Because of the side-by-side eye placement in the human anatomy, horizontal disparity is required for comfortable viewing. Although there are inventions already disclosed that create omnidirectional stereo systems, they provide vertical disparities that are not suited for direct human use. Another invention presents an omnidirectional horizontal stereo system which has significant disadvantages over the system presented in this invention in that it requires a large number of cameras and only provides horizontal disparity in a single plane.

SUMMARY OF THE INVENTION

The present invention refers to the process and the system of collecting, calibrating, encoding, broadcasting, and rendering stereo omnidirectional imagery and motion video. With increased popularity of stereo display mechanisms and head tracking systems, it will become necessary to generate content from a variety of sources that can support these devices.

The invention presents an omnidirectional system capable of collecting horizontal disparities in multiple angles. The user or users of the display system will be able to move their head, changing yaw and tilt. Another incarnation to the invention also allows for roll. The system is composed of a series of prisms and/or mirrors arranged in a circular pattern. The prisms or mirrors provide a 90 degree shift of the imagery collected, enabling a single camera to perform the image acquisition.

BRIEF DESCRIPTION OF THE DRAWINGS

The accompanying drawings, which are incorporated herein an form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Figure 1A:
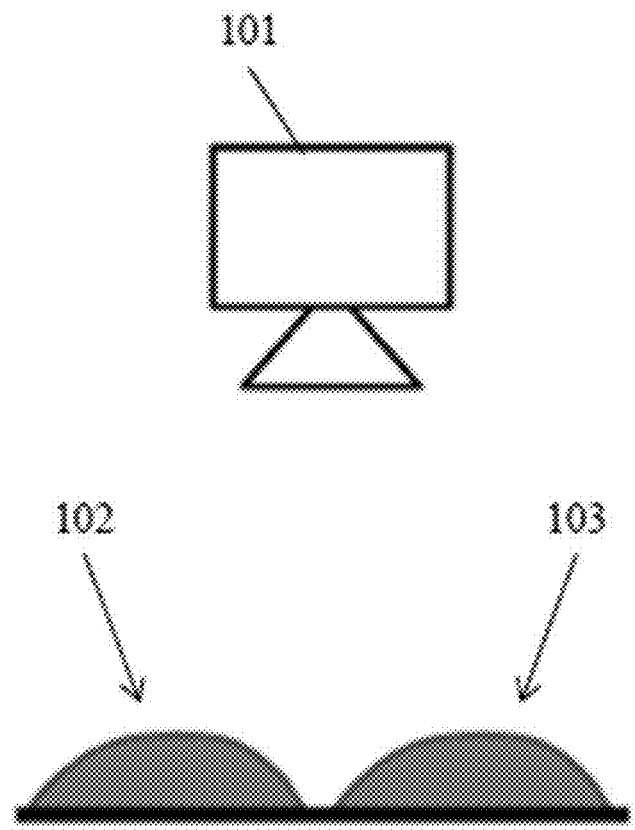
FIGS. 1A-B illustrate the different arrangements that provide the horizontal disparity needed for human stereo vision understanding; 1A, two mirror system, 1B, 6 mirror system.
Figure 1B:
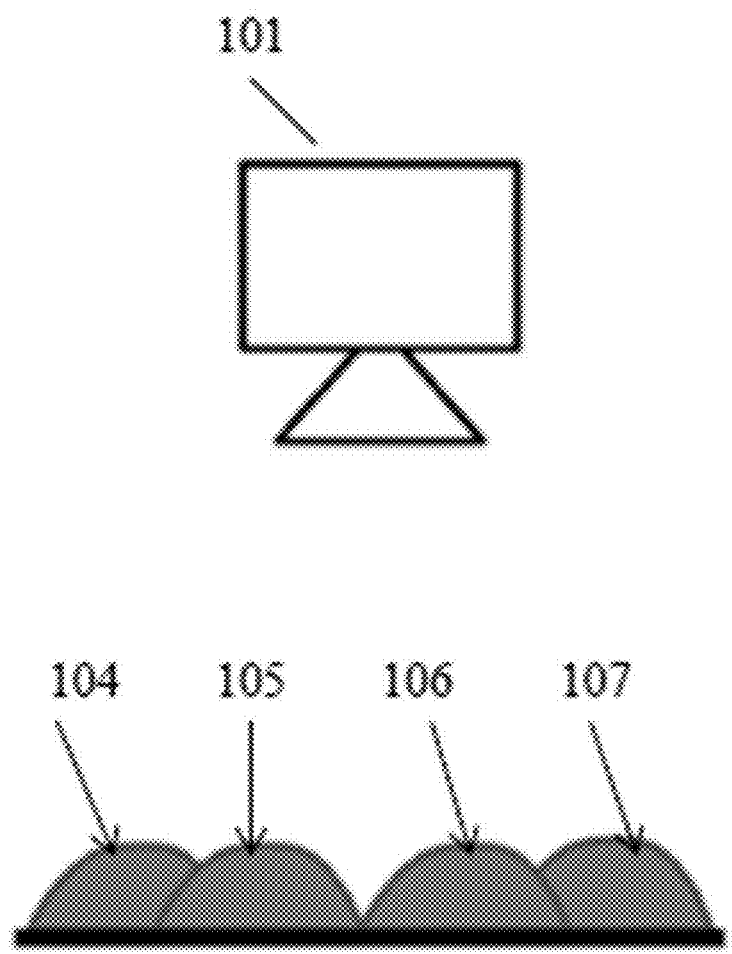
Figure 1C:
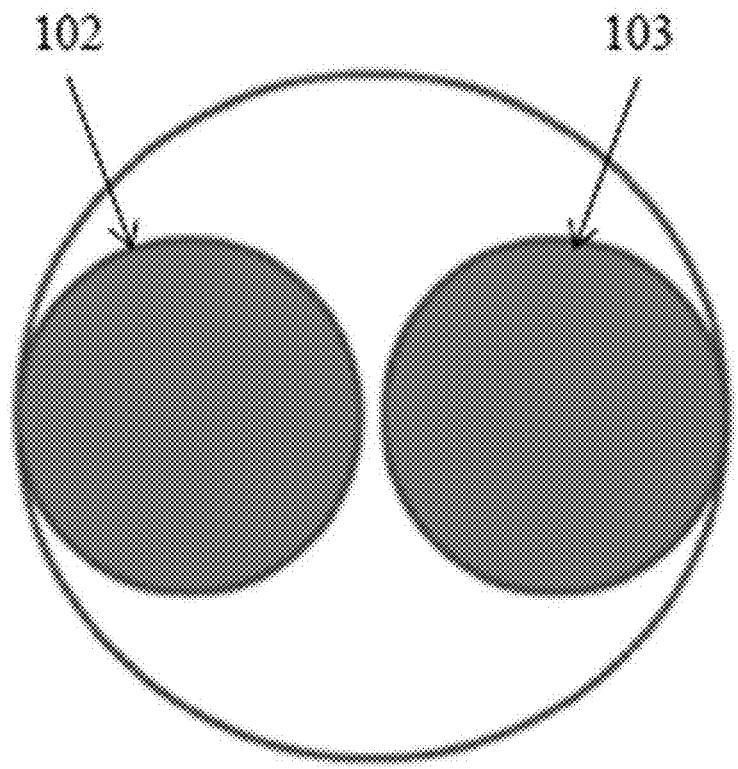
FIGS. 1C-D illustrates how a set of mirrors are arranged in a circle; 1A, two mirror system, 1B, 6 mirror system.
Figure 1D:
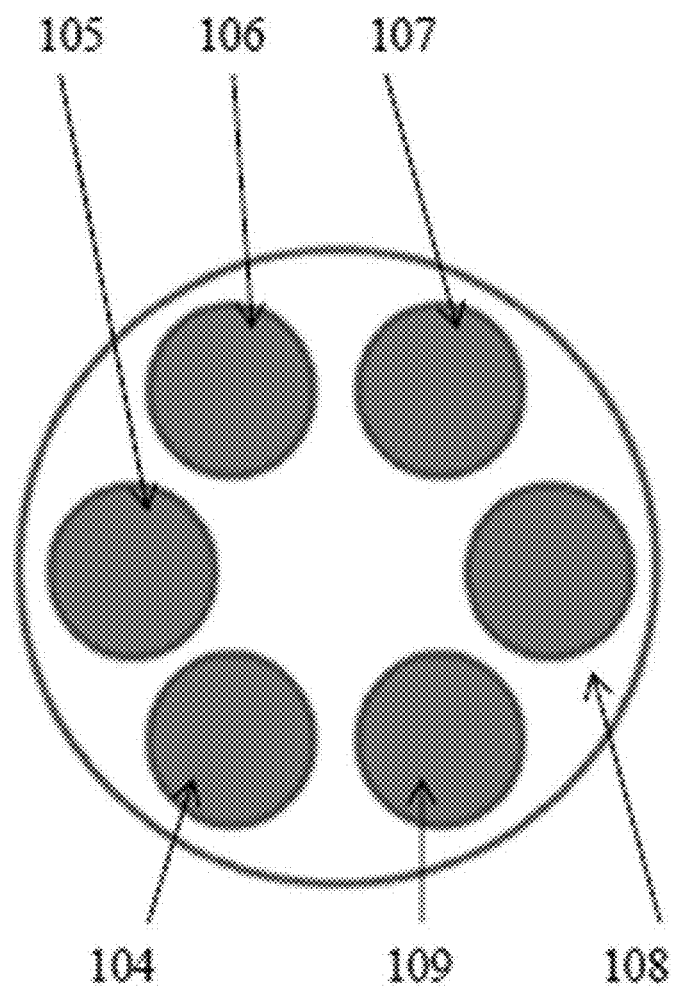

Now referring to the Figures, the embodiment of the invention presents an omnidirectional system capable of collecting horizontal disparities in multiple angles. The user of the display system will be able to move its head, changing yaw and tilt. Another incarnation to the invention also allows for roll. The system is composed of a series of prisms and/or mirrors arranged in a circular pattern. The prisms or mirrors provide a 90 degree shift of the imagery collected, enabling a single camera to perform the image acquisition. FIGS. 1A and 1C shows a two mirror system 102 and 103 and FIGS. 1B and 1D show a six mirror system 104, 105, 106, 107, 108, 109.

Figure 3A:
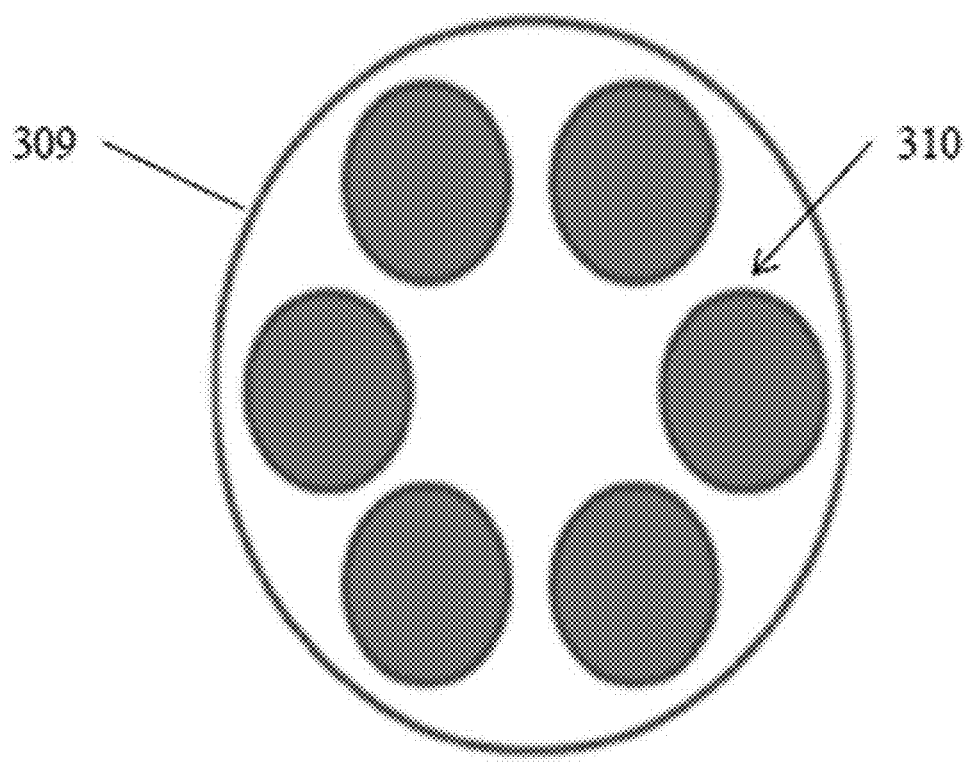
FIGS. 3A-F illustrates a set of mirrors or prisms are arranged in a circle. The different arrangements provide the horizontal disparity needed for human stereo vision understanding.
Figure 3B:
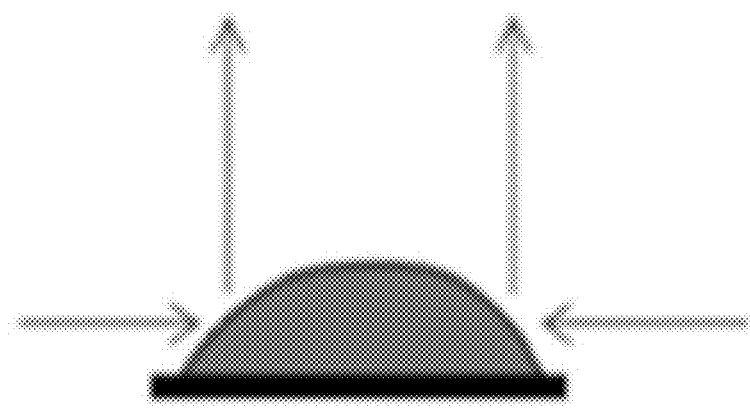

In one incarnation shown in FIGS. 3A and 3B, convex catadioptic prisms 310 arranged in a hexagonal circular pattern 309 allow the camera to collect the omnidirectional imagery from multiple view ports that then are used to provide the disparities depending on the Euler angles of the pose of the user stereo display.

A different incarnation of the same invention uses convex or concave parabolic or hyperbolic mirrors to perform the same function. Because of the nonlinear transformation of these prisms or mirrors, horizontal disparity can be provided in the horizontal plane as well as at different tilt angles. The number of individual prisms for the setup can be changed providing different disparity options and quality.

For example, the arrangement showed in FIGS. 1A and 1C, of a single camera 101 and two catadioptic mirrors 102 and 103 provides horizontal disparity mainly in two directions, forward and backward. If the user looks side to side, the disparity will decrease and therefore, the appearance of depth to the user will diminish accordingly. FIGS. 1B and 1D, shows a different arrangement of one camera 101 with six catadioptic mirrors 104-107 organized in a hexagonal pattern. This configuration provides better disparity around the 360 degree yaw angles.

Figure 2A:
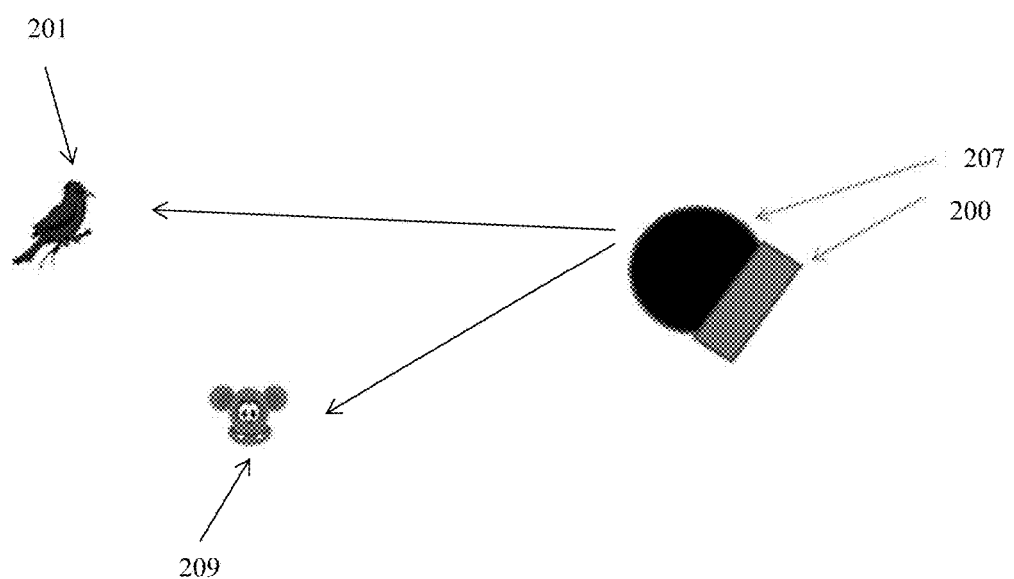
FIGS. 2A-C illustrate how the system of the present invention can reconstruct a set of images that are then to be provided to the user with respect to acquisition and rendering.
Figure 2B:
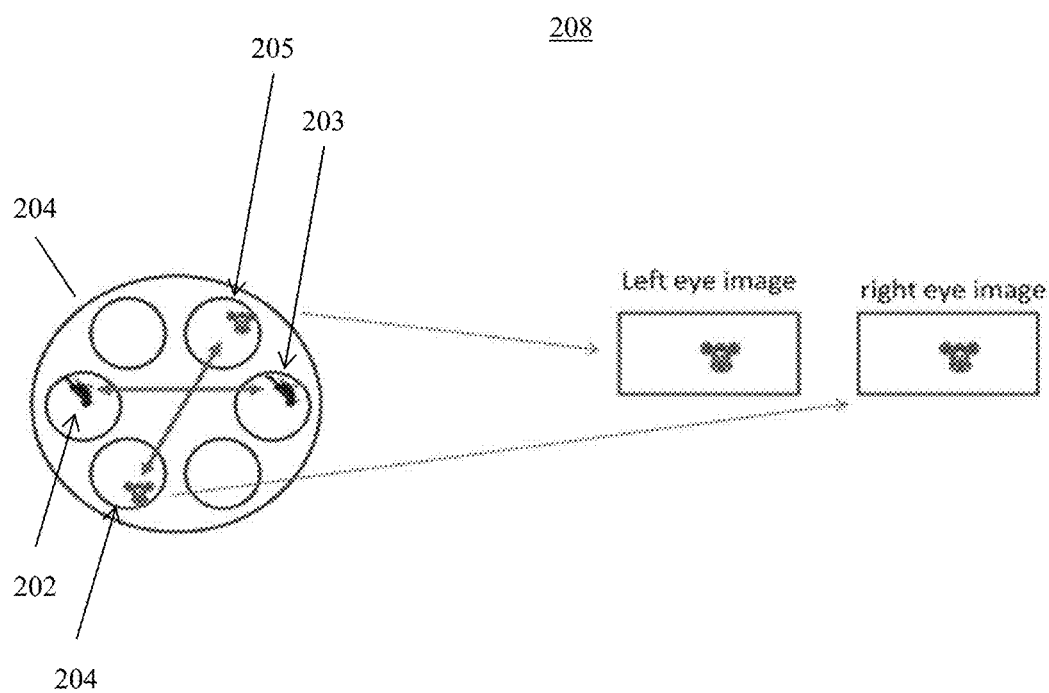
Figure 2C:
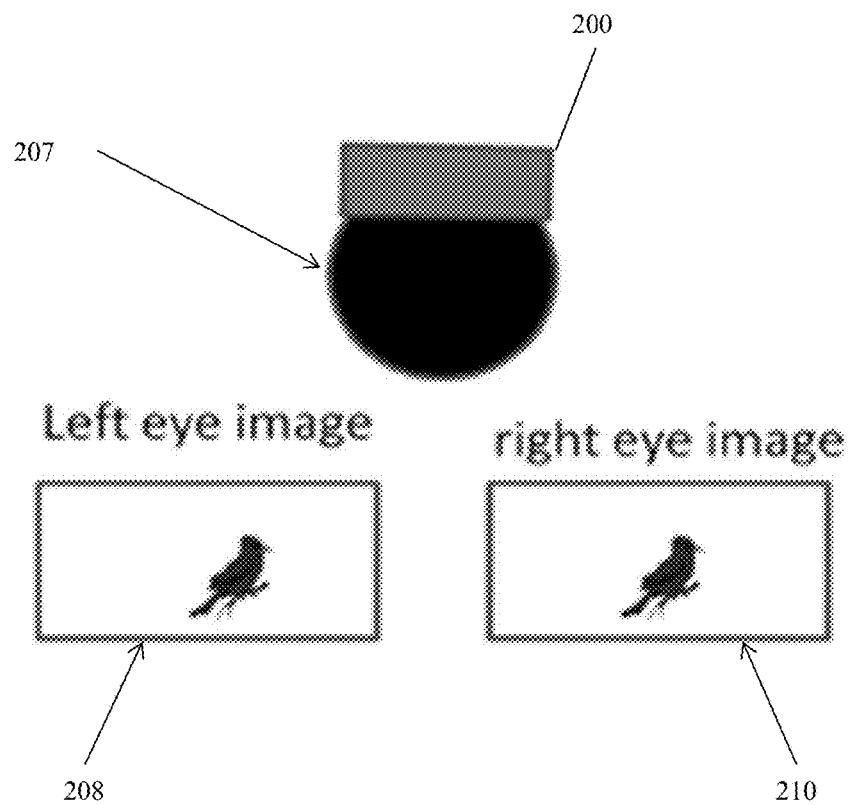

Since the system has a disparity between the mirrors in opposing sides of the circular arrangement, by selecting images in opposite sides of the circle, the system can reconstruct a set of images that are then to be provided to the user as shown in FIGS. 2A-C.

FIGS. 2A-C show an example of this image acquisition and rendering. On the left of the image we see the image acquisition apparatus, which consists of a viewing apparatus 200 worn on the head 207 of a wearer. A bird 201 and a monkey 209 are reflected in the mirrors of the six mirror system 208 shown in FIG. 2B. The camera 200 in this figure would be pointed downwards. The bird 201 is reflected in two mirrors 202 and 203 that are in opposite sides of the circular arrangement 204. The monkey is also reflected in two mirrors 205 and 206 that are in opposite sides of the circular arrangement 204. There is disparity between the two birds and the two monkeys shown in their respective two mirrors, 202 and 203, and 205 and 206. FIGS. 2A and 2B show the top view of the user/wearer's head 207. As the user rotates its head 207, a blended images 208 and 210 utilizing the cameras 200 that provides the maximum disparity is generated by geometrically rectifying the deformations created by the mirrors.

Figure 3C:
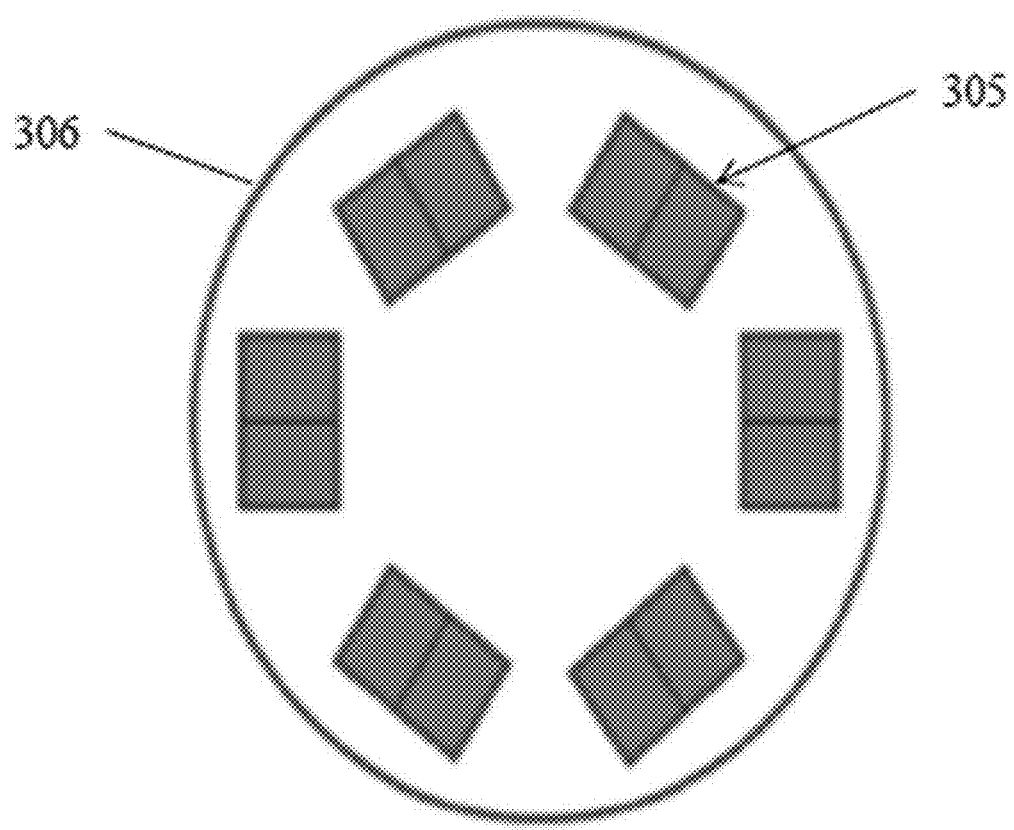
Figure 3D:
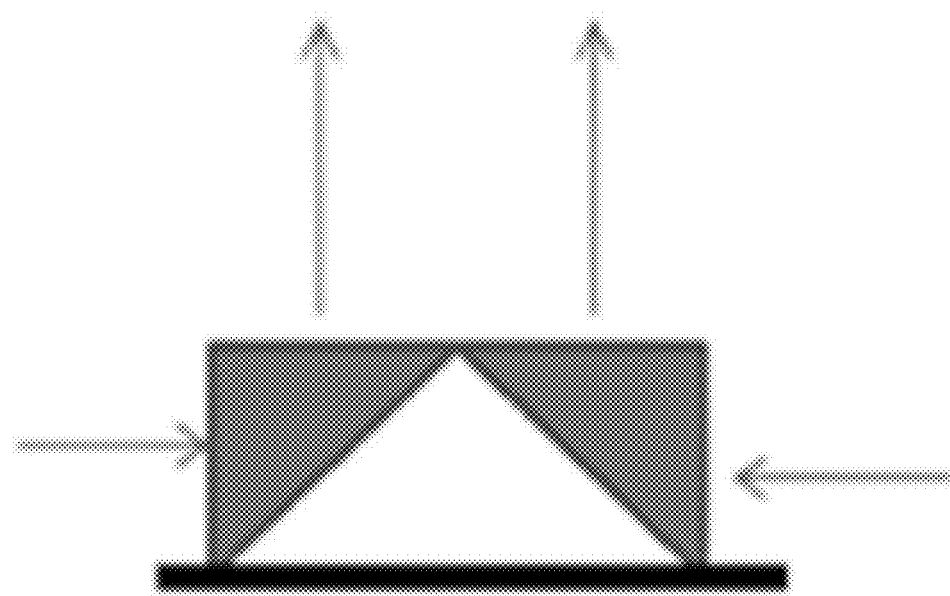

A higher number of prisms can be used to create even smoother disparity around all yaw angles at the cost of having more scenes. Another incarnation of the invention uses individual cameras each with a separate prism or mirror to increase the pixel resolution of the final rendering. By utilizing a set of modified triangular prisms 305 in a hexagonal setup 306 as shown in FIGS. 3C and 3D, the number of facets can be increased. Custom made prisms shown in FIGS. 3E and 3F that provide the 90 degree shift and spread the light through the single camera field of view can significantly increase the pixel density.

Figure 3E:
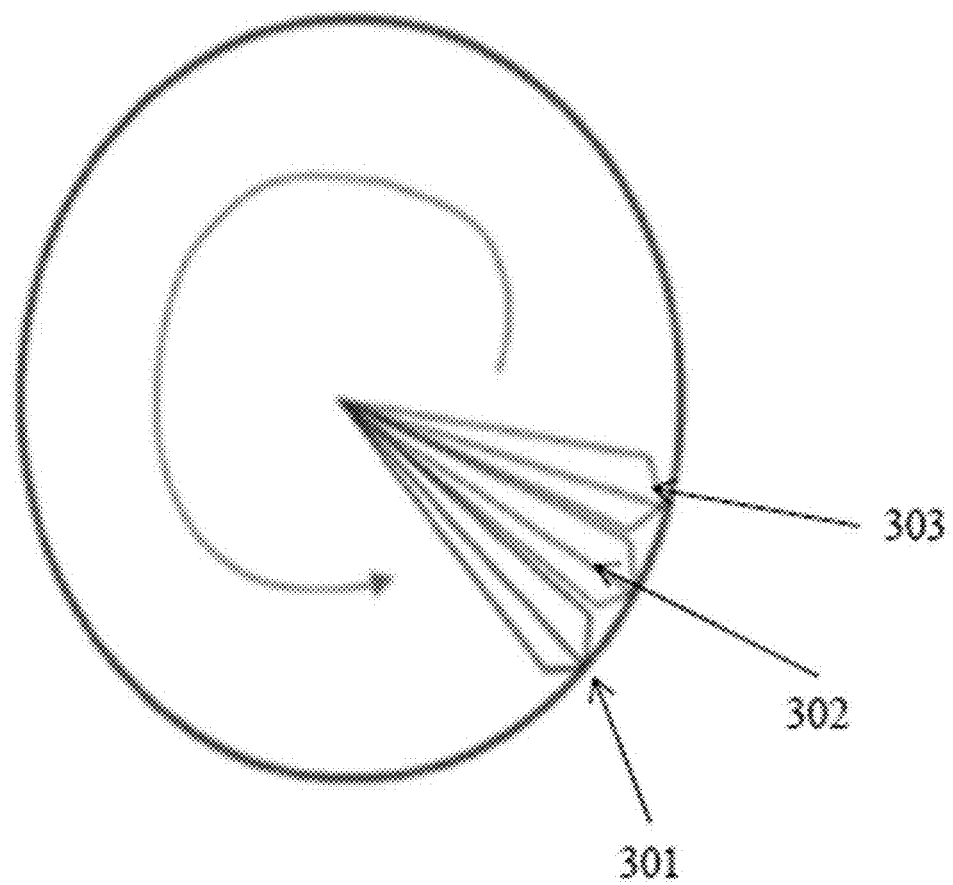
Figure 3F:
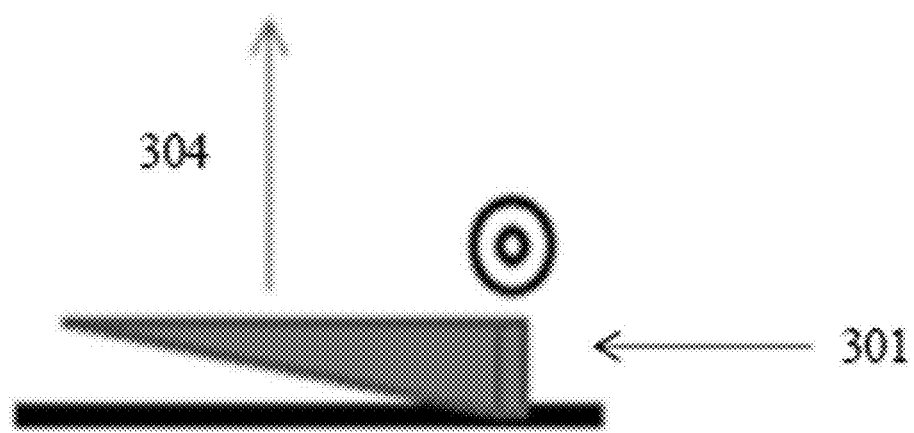
Figure 4A:
FIGS. 4A-D illustrate the two sphere encoding mechanism that provides a means of encoding horizontal disparities around the 360 deg field of view.
Figure 4B:
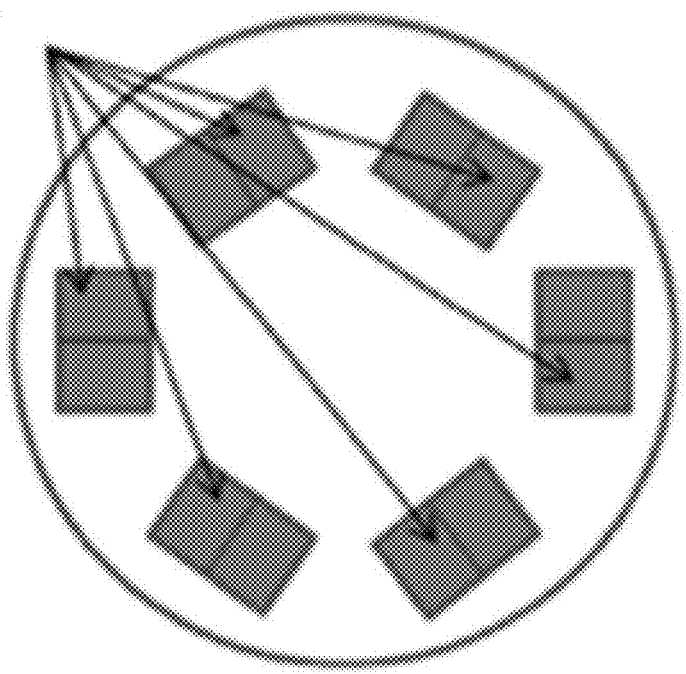
Figure 4C:
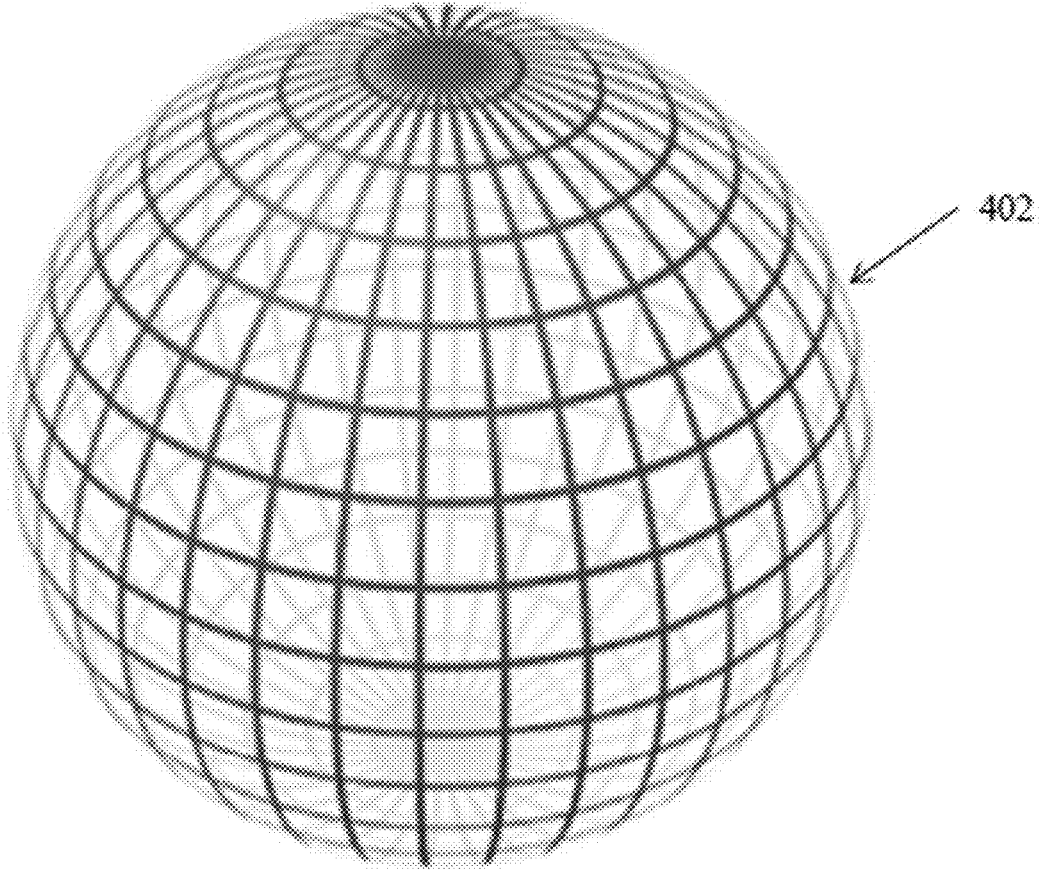
Figure 4D:
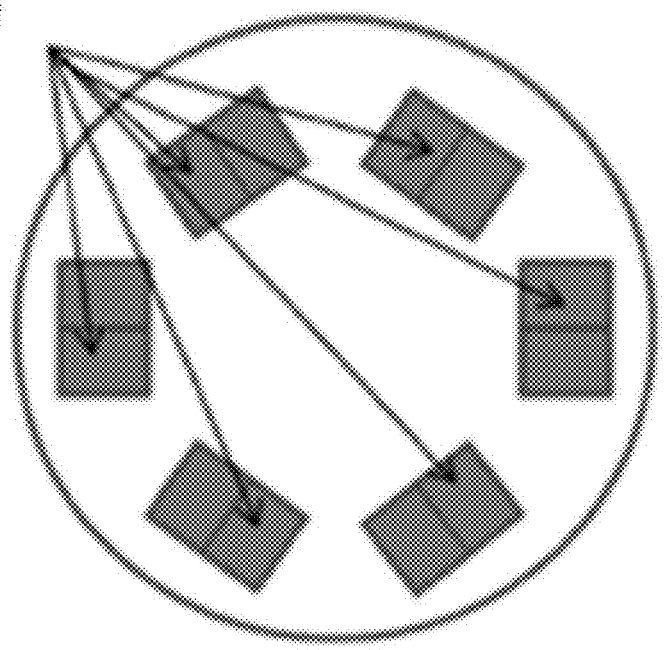

FIGS. 3E and 3F, shows one such implementation of custom made prisms that provide the 90 degree shift and spread the light through the single camera field of view. The exact prism geometric construction can vary as long as it provides a 90 degree shift. Modified triangular or pentas 301, 302, 303 can be used for this purpose. The ray entrance side of the prism 304 can be modified with a nonlinear concave or convex surface to increase the field of view of the facet and provide a suitable overlap for blending.

Another method to accomplish this same structure is to utilize fiber optic bundles. A column of fibers is aligned tangentially to the circle, and a second line is setup in the opposite direction. Finally, the fibers or can be organized to be tangential to a sphere. A similar implementation can be accomplished by arranging the CCD imagers along the tangential surface of the cylinder or sphere. A curved imager with individual pixel prisms that provide the 90 degree shift can be implemented.

A second mechanism for collecting the omnidirectional stereo imagery makes use of a single mirror or prism coupled with an active ranging sensor or sensors distributed along the horizontal plane. In one incarnation shown in FIG. 2, the ranging sensors are distributed in a hexagonal pattern around the omnidirectional mirror. These ranging sensors can make use of ladar, lidar, or structured light to collect the range image. This range information is then paired with the image transmitted through the prism and re-rendered as a stereo pair using the post of the display apparatus.

A third mechanism for collecting the omnidirectional stereo imagery makes use of two or more rotating cameras In this embodiment, the distance between the camera and the center of rotation is ½ of the desired eye disparity. In order to match human horizontal eye disparities, it is expected that the circle defined by the motion of the camera around the hinge will be in the horizontal plane. For these embodiments, line cameras can be used. Multiple camera pairs can be used to increase the "frame rate". In other words, if only two cameras are used, a complete 360 deg sweep will be completed after a complete rotation is accomplished. However, if two or more back to back camera pairs are used, then, the frame rate of the omnidirectional camera will be increased proportionally.

It is well known that stereo image processing requires that the images be calibrated in order to provide range information. Because the main intent of the invention is to be used to direct human consumption, the calibration usually associated with automated image processing may not be required. Accurate fabrication processes may be sufficient to provide a reasonable reproduction.

However, the following method presents one such calibration process that could be used for both automated and human stereo processing. Stereo processing will be affected both by the intrinsics, extrinsics, and relative pose of the different optical components. The following is a system that provides calibration at the system level and can be used to indirectly obtain the instrinsics and extrinsics.

The omnidirectional stereo apparatus is mounted on a fixed plate. A laser pointer mounted on a pan-tilt head is used to project light to a panel of known location. The resulting image is collected providing the location of the particular pixel in the image frame. Since the location of the panel is known and the location of the pointer is known, the xyz location of the projected laser beam is also known. That xyz location is used to compute the unit vector corresponding for each pixel on the image. This collection of unit vectors that map the particular image pixel to array and space will be used by the rendering system to figure out the display using simple geometrical transformations.

A second incarnation of the same invention places the sensing apparatus on a pan-tilt head while maintaining the projected dot in a known location. To speed up the calibration process, the number of pixels measured can be a sub sample of the complete set. Linear and nonlinear approximators are used to interpolate the subsample set. If the model of the individual optical devices (prisms or mirrors) is known, the complete or partial set can be used to optimize the model parameters using standard nonlinear optimization methods.

The same method can be used for calibrating the range sensors by swapping the laser dot by a morphological feature that can be recovered by the range sensors. Once such feature has been utilized is a hole or drop off in the panel that can easily be sensed as a range discontinuity on the ladar imager.

Because it is likely these systems will be used for motion imagery, the methods that emphasize pixel continuity in space and time are likely to provide higher compression ratios. This section will provide a few encoding techniques that take advantage of the understanding that the sequence of the images encoded have continuities that can be exploited by the compression technique.

In a quasi-concentric image spheres method, the imagery collected from the prisms is geometrically transformed and blended into two image spheres. Each corresponding pixel on both spheres is selected to provide the physical disparity closely related to the disparity of the physical display apparatus. This method extends current methods in the literature for blending multiple images into a single omnidirectional image. The main difference is that the methods commonly presented in the literature the point of view from where the image is taken is unique and fixed.

In the presented invention, the point of view changes in a circle for the generation of each omni-directional images. In the second sphere, the point of view also changes in a circle. The difference between the two omnidirectional spheres is that the point of view is 180 degrees out of phase with one another as shown in FIGS. 2A-C. Because of this 180 degree phase shift, there is a horizontal disparity equivalent to the diameter of the circle of mirrors as shown in FIGS. 4A-D.

By selecting this diameter to be close to human eye separation by projecting sections of the blended image spheres into each one of the eyes of the user, 3D stereo will be reconstructed. There are errors generated by this process in the sense that the images cannot be fully blended into a single sphere because they were collected from different viewpoints (i.e. 6 viewpoints in the hexagonal setup).

The proposed apparatus has a number of different prism components. The higher number of prisms used will diminish the number of errors created by the blending process, therefore a two prism system will have higher errors in the blended image than a six prism system and so forth.

Ultimately, the limit of this approach has an individual collection element per vertical line of the blended image. At that point, the blending errors of the system will be unperceivable to the users. A similar concept is used for encoding these images as with mpeg video. If the images collected are at infinity, the disparity differences between the two concentric circles will not affect the blended images on the spheres. Therefore, the two spheres 401 and 402 would be identical and the amount of information will be half. As the objects get closer to the view ports, the difference in the spheres will increase. By trading these two spheres as subsequent images on an mpeg stream, the standard mpeg algorithm will exploit the similarities. Each sphere will also have continuity with the next sphere on the video sequence. This continuity will also be exploited by the mpeg algorithms.

In a second embodiment, Texture and Range Streams use a different encoding mechanism that is composed of three different streams. The first stream provides an omnidirectional image from one of the viewpoints (i.e. left eye), while a second stream provides a range map for each pixel in the sphere. Finally, the third stream provides a list of occluded fillets both in range and in texture. These are the surfaces that are occluded on the left image, but become visible by the right eye (or head motion). By providing these hidden surfaces (from the left eye) with sufficient margin to cover the image disparity created by the eye separation and motion of the head, the right eye image can be synthesized. This reconstruction occurs using the range information, the left eye information, and the fillets.

Encoding information this way will be an approximation in the sense that all of the range information will be provided by the morphological disparity encoded into the range maps, but changes in the texture of the surfaces created by the eye separation will not be taken under consideration. This will not affect non reflective surfaces, but it will affect mirrors in the scene. In an extension to the invention, local rendering of reflecting surfaces can be accomplished using the standard video gaming techniques. These reflections can then be added to the left eye textures providing the user with a more realistic experience. This encoding mechanism is well suited for encoding 3D animated movies where range and fillets can be easily extracted and texture has already been generated as part of the model that is used for generating the textures.

In a third embodiment, using Direct Encoding by Symmetric Bi-sections, the collection apparatus presented in Section 1 have natural image partitions created by the number of prisms or mirrors used. This method exploits these partitions to provide better encoding. Because the prisms are mounted to a fixed surface, images in each individual prism will rotate and move in unison.

However, because of the inversions and symmetries created by the prisms, the apparent motion of the image as seen by the single camera will be in different directions, therefore confusing standard encoding techniques. Bisecting and rotating the subsections of the images, the images of each prism can be aligned, flipped, and rotated to allow standard mpeg encoding techniques to be effective. Alternative modifications to the mpeg algorithms can be implemented where the known correlation between the motion vectors of different parts of the image are exploited.

State of the art 3D movies are easily rendered given the fact that the pose of the stereo goggles used for displaying it is assumed to be set a priori. In other words, the Euler angles of the viewing system do not change with the motion of the head. On head mounted stereo displays, this is not the case. Since the pose of the viewing apparatus is not known a priori, it is not possible to pre-render each pose for broadcast and display. Therefore, a smarter display method is needed. Given the presented encoding techniques in the previous section, the rendering system will need to generate a viewport for each eye that provides the images to be displayed by the display system in response to the viewer moving their head.

The rendering changes depending on the encoding process.

In a first rendering embodiment, quasi-concentric image spheres provide one of the simplest decoding methods.

Given the Euler angles of the display apparatus, the sphere is cropped to retrieve the view port required by the display. One sphere provides the right image, the second sphere provide the left image.

In a second rendering embodiment, Texture and Range Streams are used. In this embodiment, the image for the left eye is a direct crop (if no head x,y,z motion is considered), however, the image for the right needs to be generated. Given that the range image is available, each pixel can be rotated using a graphic engine. The rotation will expose areas hat where originally hidden. These hidden surfaces can be recovered from the list of fillets available on the third stream. As mention earlier, the rotation of the textures will introduce errors. For most applications, these errors will not be perceivably by the viewer.

In a third rendering embodiment, Direct Encoding by Symmetric Bi-sections occurs. In this embodiment, the rendering device will need to perform the real-time blending of the images and cropping for both eyes. The method is similar to the process used for the generation of the image spheres on the first embodiment, with the main difference that it needs to be performed in real-time, and there is no need to blend the complete sphere, only the portion of the sphere that will be displayed to the user.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. An omnidirectional device capable of collecting horizontal disparities in multiple angles comprising:
   a series of prisms and/or mirrors arranged in a circular pattern;
   the prisms or mirrors provide a 90 degree shift of the imagery collected, enabling a single camera to perform the image acquisition;
   the exact prism geometric construction can vary as long as it provides a 90 degree shift;
   modified triangular or pentas can be used for this purpose; and
   the ray entrance side of the prism can be modified with a nonlinear concave or convex surface to increase the field of view of the facet and provide a suitable overlap for blending.

2. The device of claim 1, wherein a convex catadioptric prisms allow a camera to collect the omnidirectional imagery from multiple view ports that then are used to provide the disparities depending on the Euler angles of the pose of the user stereo display.

3. The device of claim 1, wherein
   convex or concave parabolic or hyperbolic mirrors perform the same function; and
   a first arrangement provides horizontal disparity in the forward and backward directions with respect to the mirrors.

4. The device of claim 1, comprising six catadioptric mirrors organized in a hexagonal pattern.

5. The device of claim 1, wherein
   selecting images from opposing sides of the circle, the system can reconstruct a set of images that are then to be provided to the user;
   the higher number of prisms used creates reduced disparity around all yaw angles at the cost of having more scenes; and
   individual cameras each separate prism or mirror to increase the pixel resolution of the final rendering.

6. The device of claim 1, wherein
   a first column of fiber optic bundles is aligned tangentially to the circle of prisms or mirrors;
   a second column of fiber optic bundles is aligned tangentially in the opposite direction with respect to the circle of prisms or mirrors; and
   the fiber optic bundles are organized to be tangential to a sphere of prisms or mirrors.

7. The device of claim 1, wherein
   arranging the CCD imagers along the tangential surface of the cylinder or sphere; and
   a curved imager with individual pixel prisms that provide the 90 degree shift can be implemented.

8. An omnidirectional device capable of collecting horizontal disparities in multiple angles comprising:
   a series of prisms and/or mirrors arranged in a circular pattern;
   the prisms or mirrors provide a 90 degree shift of the imagery collected, enabling a single camera to perform the image acquisition;
   a second mechanism for collecting the omnidirectional stereo imagery makes use of a single mirror or prism coupled with an active ranging sensor or sensors distributed along the horizontal plane;
   the ranging sensors are distributed in a hexagonal pattern around the omnidirectional mirror;
   these ranging sensors can make use of ladar, lidar, or structured light to collect the range image; and
   this range information is then paired with the image transmitted through the prism and re-rendered as a stereo pair using the post of the display apparatus.

9. The device of claim 1, wherein
   the omnidirectional stereo apparatus is mounted on a fixed plate;
   a laser pointer mounted on a pan-tilt head is used to project light to a panel of known location;
   the resulting image is collected providing the location of the particular pixel in the image frame;
   since the location of the panel is known and the location of the pointer is known, the xyz location of the projected laser beam is also known, that three dimensional location is used to compute the unit vector corresponding for each pixel on the image; and
   this collection of unit vectors that map the particular image pixel to array and space will be used by the rendering system to figure out the display using simple geometrical transformations.

10. An omnidirectional device capable of collecting horizontal disparities in multiple angles comprising:
    a series of prisms and/or mirrors arranged in a circular pattern;
    the prisms or mirrors provide a 90 degree shift of the imagery collected, enabling a single camera to perform the image acquisition;
    the sensing apparatus is placed on a pan-tilt head while maintaining the projected dot in a known location;
    the sensing apparatus is comprised of two or more back to back camera pairs;

to speed up the calibration process, the number of pixels measured can be a sub sample of the complete set;

linear and nonlinear approximators are used to interpolate the subsample set; and if the model of the individual optical devices (prisms or mirrors) is known, the complete or partial set can be used to optimize the model parameters using standard nonlinear optimization methods.

11. The device of claim 10, wherein the same method can be used for calibrating the range sensors by swapping the laser dot by a morphological feature that can be recovered by the range sensors; and once such feature has been utilized is a hole or drop off in the panel that can easily be sensed as a range discontinuity on the ladar imager.

12. The device of claim 1, wherein a quasi-concentric image spheres method, the imagery collected from the prisms is geometrically transformed and blended into two image spheres; and each corresponding pixel on both spheres is selected to provide the physical disparity closely related to the disparity of the physical display apparatus.

13. An omnidirectional device capable of collecting horizontal disparities in multiple angles comprising:

a series of prisms and/or mirrors arranged in a circular pattern;

the prisms or mirrors provide a 90 degree shift of the imagery collected, enabling a single camera to perform the image acquisition;

wherein texture and range streams use a different encoding mechanism that is composed of three different streams, the first stream provides an omnidirectional image from one of the viewpoints;

a second stream provides a range map for each pixel in the sphere;

a third stream provides a list of occluded fillets both in range and in texture;

these are the surfaces that are occluded on the left image, but become visible by the right eye (or head motion);

providing these hidden surfaces from the left eye with sufficient margin to cover the image disparity created by the eye separation and motion of the head, the right eye image can be synthesized;

this reconstruction occurs using the range information, the left eye information, and the fillets;

encoding information this way will be an approximation in the sense that all of the range information will be provided by the morphological disparity encoded into the range maps, but changes in the texture of the surfaces created by the eye separation will not be taken under consideration, this will not affect non reflective surfaces, but it will affect mirrors in the scene.

14. The device of claim 6, wherein local rendering of reflecting surfaces can be accomplished using the standard video gaming techniques; and these reflections are added to the left eye textures.

15. The device of claim 1, wherein using Direct Encoding by Symmetric Bi-sections, the collection apparatus have natural image partitions created by the number of prisms or mirrors used;

because the prisms are mounted to a fixed surface, images in each individual prism will rotate and move in unison;

because of the inversions and symmetries created by the prisms, the apparent motion of the image as seen by the single camera will be in different directions, therefore confusing standard encoding techniques; and bisecting and rotating the subsections of the images, the images of each prism can be aligned, flipped, and rotated to allow standard mpeg encoding techniques to be effective.

16. The device of claim 1, wherein in a first rendering embodiment, quasi-concentric image spheres provide one of the decoding methods;

given the Euler angles of the display apparatus, the sphere is cropped to retrieve the view port required by the display; and one sphere provides the right image, the second sphere provide the left image.

17. The device of claim 1, wherein the image for the left eye is a direct crop if no head three dimensional motion is considered, however, the image for the right needs to be generated;

given that the range image is available, each pixel can be rotated using a graphic engine;

the rotation will expose areas that where originally hidden; and these hidden surfaces can be recovered from the list of fillets available on a generated image stream.

18. The device of claim 1, wherein the rendering device will need to perform the real-time blending of the images and cropping for both eyes; and only the portion of the sphere that will be displayed to the user.

* * * * *